(12) United States Patent
Mo et al.

(10) Patent No.: US 7,532,867 B1
(45) Date of Patent: May 12, 2009

(54) TRANSCEIVER ARCHITECTURE FOR SUPPORTING MULTI-BAND RF

(75) Inventors: Shih Mo, Milpitas, CA (US); Junjie Yang, Santa Clara, CA (US); Lin Zhou, Milpitas, CA (US); Chung-Hsing Chang, Milpitas, CA (US); Ted Hsiung, Saratoga, CA (US)

(73) Assignee: Chenyu Chang

( * ) Notice: Subject to any disclaimer, the term of this patent is extended or adjusted under 35 U.S.C. 154(b) by 465 days.

(21) Appl. No.: 11/377,695

(22) Filed: Mar. 15, 2006

(51) Int. Cl.
*H04B 1/44* (2006.01)
*H04Q 7/20* (2006.01)

(52) U.S. Cl. .................... 455/78; 455/127.4; 455/552.1

(58) Field of Classification Search .................. 455/76, 455/78, 84–86, 127.4, 260, 552.1, 553.1
See application file for complete search history.

(56) References Cited

U.S. PATENT DOCUMENTS

| 6,728,525 | B1 * | 4/2004 | Leizerovich et al. | ........ 455/260 |
| 7,263,080 | B1 * | 8/2007 | Zhu et al. | .................... 370/328 |
| 2004/0121753 | A1 * | 6/2004 | Sugar et al. | ................. 455/333 |

* cited by examiner

*Primary Examiner*—Lee Nguyen
(74) *Attorney, Agent, or Firm*—Joe Zheng

(57) ABSTRACT

Transceiver architectures for supporting multi-band radio frequencies are disclosed. According to one aspect of the present invention, a number of processing channels are designed, each for one specified carrier frequency. A number of switching means is provided to ensure that a processing channel is properly selected for a specified carrier frequency. Each of the processing channels includes at least an amplified and a low-pass filter, where the low-pass filter is automatically programmable in response to a wireless standard (e.g., Wi-Fi or WiMAX). A single voltage oscillator (VCO) is used to support operations of each of the processing channels.

18 Claims, 4 Drawing Sheets

TRANSCEIVER ARCHITECTURE FOR SUPPORTING MULTI-BAND RF

BACKGROUND OF THE INVENTION

1. Field of the Invention

The present invention is related to the area of integrated circuit designs. More particularly, the present invention is related to techniques of designing integrated circuits supporting multiple bands of radio frequency (RF).

2. Description of the Related Art

With the evolution of wireless communications, there are many types of standards or protocols being adopted to facilitate wireless communication between devices. Examples of such standards include 802.11a, 802.11b, 802.11g, 802.16d and 802.16e. Depending on actual applications, it is not possible to conclude one standard is better than another standard. As a result, various chips have to be designed, each for one or more standards.

Multiple chips can meet the market needs but increase engineering costs and design cycles. On the other end, integrating all standards in a single chip could potentially increase the die size, resulting in higher cost of the chip. There is, thus, a need for an integrated circuit architecture that integrates functions provided in more than one standard by using common functional blocks so that the resultant chips can support more than one standard without significantly increasing the design complexity and die size.

In a typical application of such baseband chips, there is a RF interface circuit, also referred to as a transceiver, to receive/transmit signals from/to another device via air by means of radio. Such a transceiver shall also be able to handle RF signals in multiple bands. Regardless of whatever standard a type of wireless communication is conducted with, signals may be received or transmitted at different carrier frequencies. Some of the common exemplary carriers include 700 MHz, 2 GHz, 3 GHz, and 5 GHz bands. A device may very well operate in a region that only supports 700 MHz band. The same device may be brought into a region that provides a carrier frequency other than the 700 Mz band. It would be desirable that such a device operates anyway regardless whatever the carrier frequency may be. Thus, there is a need for a transceiver architecture that may support multiple RF bands.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention The invention pertains to a transceiver architecture for supporting multi-band radio frequencies. According to one aspect of the present invention, a number of processing channels are designed, each for one specified carrier frequency. A number of switching means is provided to ensure that a processing channel is properly selected for a specified carrier frequency. Each of the processing channels includes at least an amplified and a low-pass filter, where the low-pass filter is automatically programmable in response to a wireless standard (e.g., Wi-Fi or WiMAX). A single voltage controlled oscillator (VCO) is used to support operations of each of the processing channels.

According to another aspect of the present invention, an exemplary baseband processor is uniquely designed to interface with the transceiver to facilitate wireless communications in a Wi-Fi network as well as a WiMAX network. As a result, same chips may be used in a relay station, also referred to herein a mini basestation, that bridges a WiMAX network and a Wi-Fi network. The same chips may also be used in a pure WiMAX network as well as a pure WiFi network.

The present invention may be implemented as an integrated circuit, an apparatus or a part of a system. According to one embodiment, an integrated circuit comprises a plurality of processing channels, each configured for a specified carrier frequency and including at least an amplifier and a low-pass filter, wherein the low-pass filter is automatically programmable in accordance with a wireless standard; and a single voltage controlled oscillator (VCO) to support operations of each of the processing channels. The processing channels are coupled to a switching means that determines which one of the processing channels is coupled to another switching means for proper operation on an antenna. In an exemplary application where the wireless standard is one of Wi-Fi and WiMAX. The cut-off frequency of the low-pass filter is set to be a first frequency when the integrated circuit is expected to operate for Wi-Fi, and a second frequency when the integrated circuit is expected to operate for WiMAX.

The foregoing and other objects, features and advantages of the invention will become more apparent from the following detailed description of a preferred embodiment, which proceeds with reference to the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The detailed description of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Wi-Fi (or Wi-fi, WiFi, Wifi, wifi), short for "Wireless Fidelity", is a set of product compatibility standards for wireless local area networks (WLAN) based on the IEEE 802.11 specifications. New standards beyond the 802.11 specifications, such as IEEE 802.16, are currently in the works and offer many enhancements, anywhere from longer range to greater transfer speeds. Wi-Fi is intended to be used for mobile devices and LANs, but is now often used for Internet access. It enables a person with a wireless-enabled computer or personal digital assistant (PDA) to be connected to the Internet when in proximity of an access point. The geographical region covered by one or several access points is called a hotspot.

WiMAX, based on the IEEE 802.16-2004 Air Interface Standard, is rapidly proving itself as a technology that will play a key role in fixed broadband wireless metropolitan area networks. It is a broadband wireless solution that enables convergence of mobile and fixed broadband networks through a common wide area broadband radio access technology and flexible network architecture.

Figure 1A:
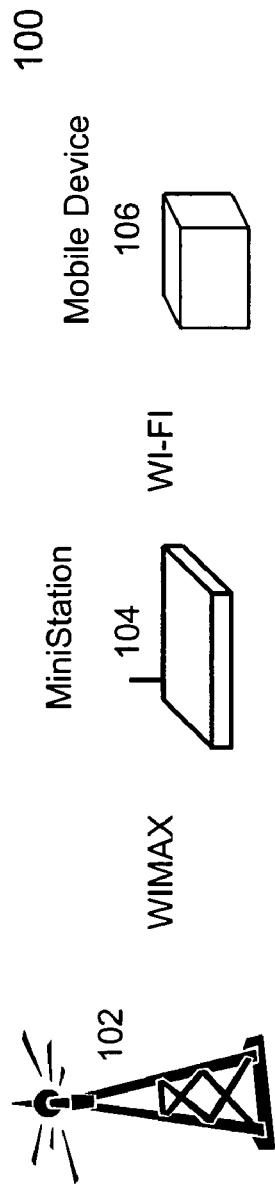
FIG. 1A shows a configuration in which a wireless service infrastructure (e.g., a wireless service provider or an antenna) provides WiMAX services while a mobile device is not ready to receive the WiMAX services and can only receive Wi-Fi services.

It is now commonly understood that Wi-Fi and WiMAX provide respective unique solutions. As a result, there are individual chips supporting Wi-Fi only as well as chips supporting WiMAX only. However, there are cases in which Wi-Fi and WiMAX are both needed to complement to each other. Referring to FIG. 1A, there shows a configuration 100 in which a wireless service infrastructure 102 (e.g., a wireless service provider or an antenna) provides WiMAX services while a mobile device 106 is not ready to receive the WiMAX services and can only receive Wi-Fi services. According to one embodiment of the present invention, a relay station 104, also referred to as a MiniStation, is provided to bridge the two different services.

A traditional design of the relay station 104 would employ at least two different baseband chips, one configured to facilitate the wireless communication between the infrastructure 102 and the relay station 104, and the other to facilitate the wireless communication between the relay station 104 and the mobile device 106. The designs of the two different baseband chips would take a longer engineering time and be complicated.

Figure 1B:
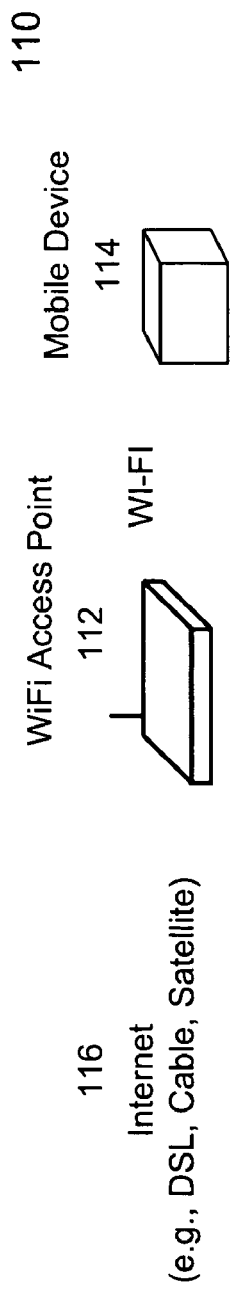
FIG. 1B and FIG. 1C, respectively, show two respective configurations in which a same chip designed in accordance with the present invention can be used.
Figure 1C:
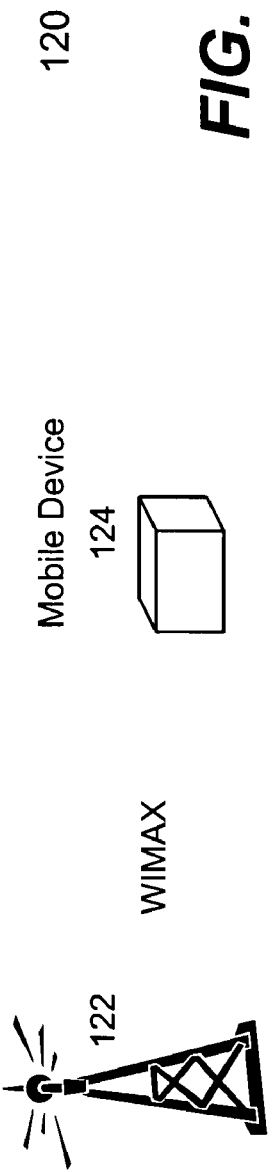

As will be detailed below, due to the unique architecture in the present invention, two identical chips are used to facilitate the wireless communication across two different technologies. The same chips may be used in the configurations 110 and 120, respectively shown in FIG. 1B and FIG. 1C. Both the Wi-Fi access point 112 and a mobile device 114 are equipped with the same chips. FIG. 1B shows that the Wi-Fi access point 112 is provided to connect the mobile device 114 to the Internet 116. Similarly, a mobile device 124 in FIG. 1C is equipped with the same chip. FIG. 1C shows that the mobile device 124 communicates with a WiMAX wireless service infrastructure 122.

Nevertheless, neither Wi-Fi nor WiMAX is provided at a fixed carrier frequency. Depending on a region, Wi-Fi and WiMAX may be provided at two completely different carrier frequencies, for example, one at 700 MHz and the other at 5 GHz. Even a same network may operate at two completely different carrier frequencies. As a result, a transceiver has to be intelligently designed to interact with most commonly used carrier frequencies.

Figure 2:
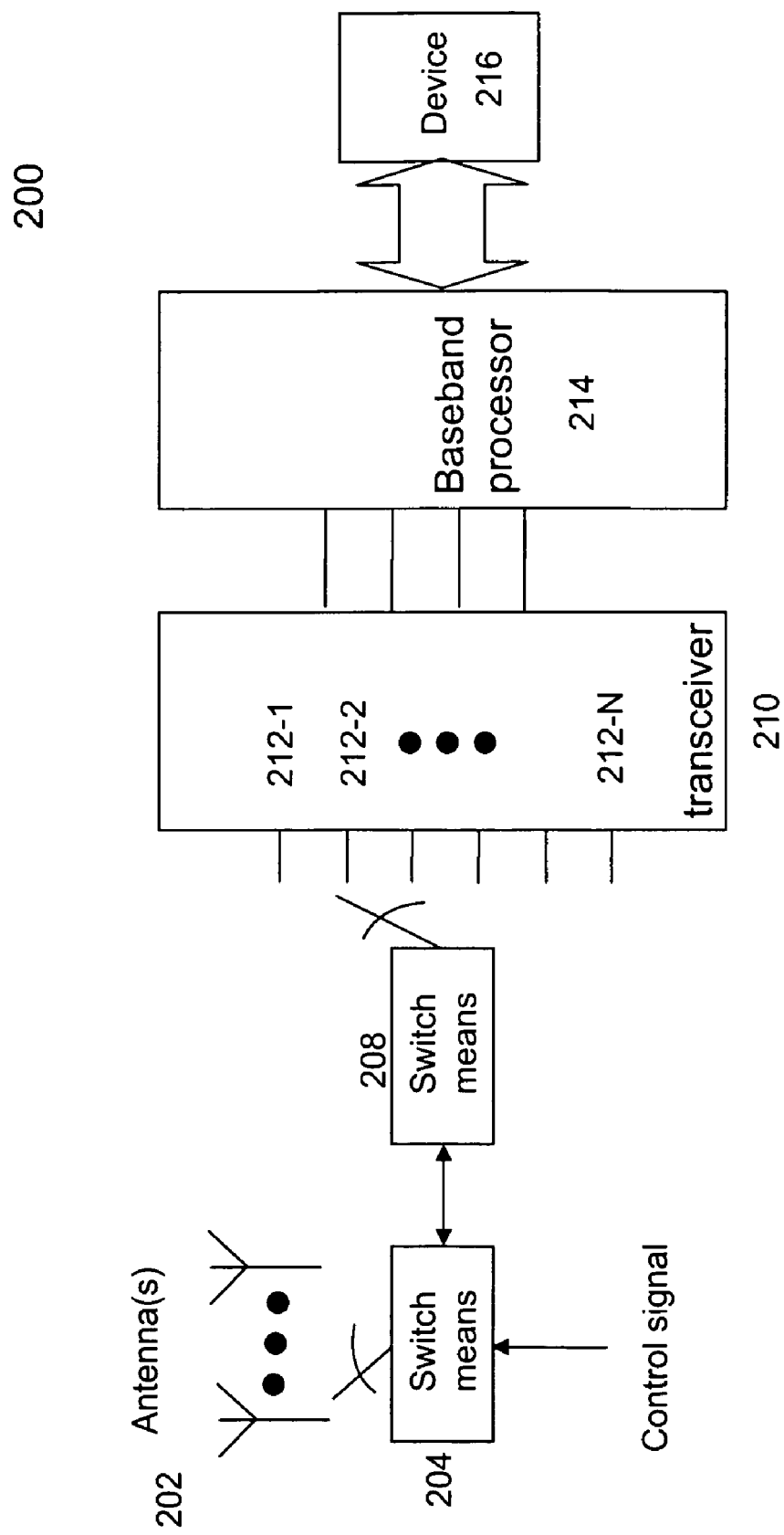
FIG. 2 shows a block diagram of an integrated circuit according to one embodiment of the present invention.

Referring now to FIG. 2, there shows a configuration 200 in which the present invention is practiced. The configuration 200 may be a device or part of a system used to communicate with a wireless network. As shown, there are a number of antennas 202, each designed for one carrier frequency. A switch means 204 (e.g., a multiplexier) is provided to select one of the antennas 202 to receive/transmit data. The switch means 204 is controlled by a control signal 206. The control signal 206 may be provided by another circuit determining what carrier frequency is being expected or sensed.

There is a second switching means 208 (e.g., a multiplexier) that is provided to couple the switch means 204 to a transceiver 210 that includes a plurality of processing channels 212, each is designed to process signals at a specified carrier frequency. The transceiver 210 is coupled to a baseband processor 214 for signals to be transmitted or received. In a transmitting operation, the transceiver 210 receives signals from the baseband processor 214 and processes the signals according to a specified carrier frequency before the signals are coupled to an appropriate antenna for transmission. In a receiving operation, the transceiver 210 receives signals from an appropriate antenna and processes the signal in an appropriate processing channel before coupling the signals to the bansband processor 214.

Figure 3:
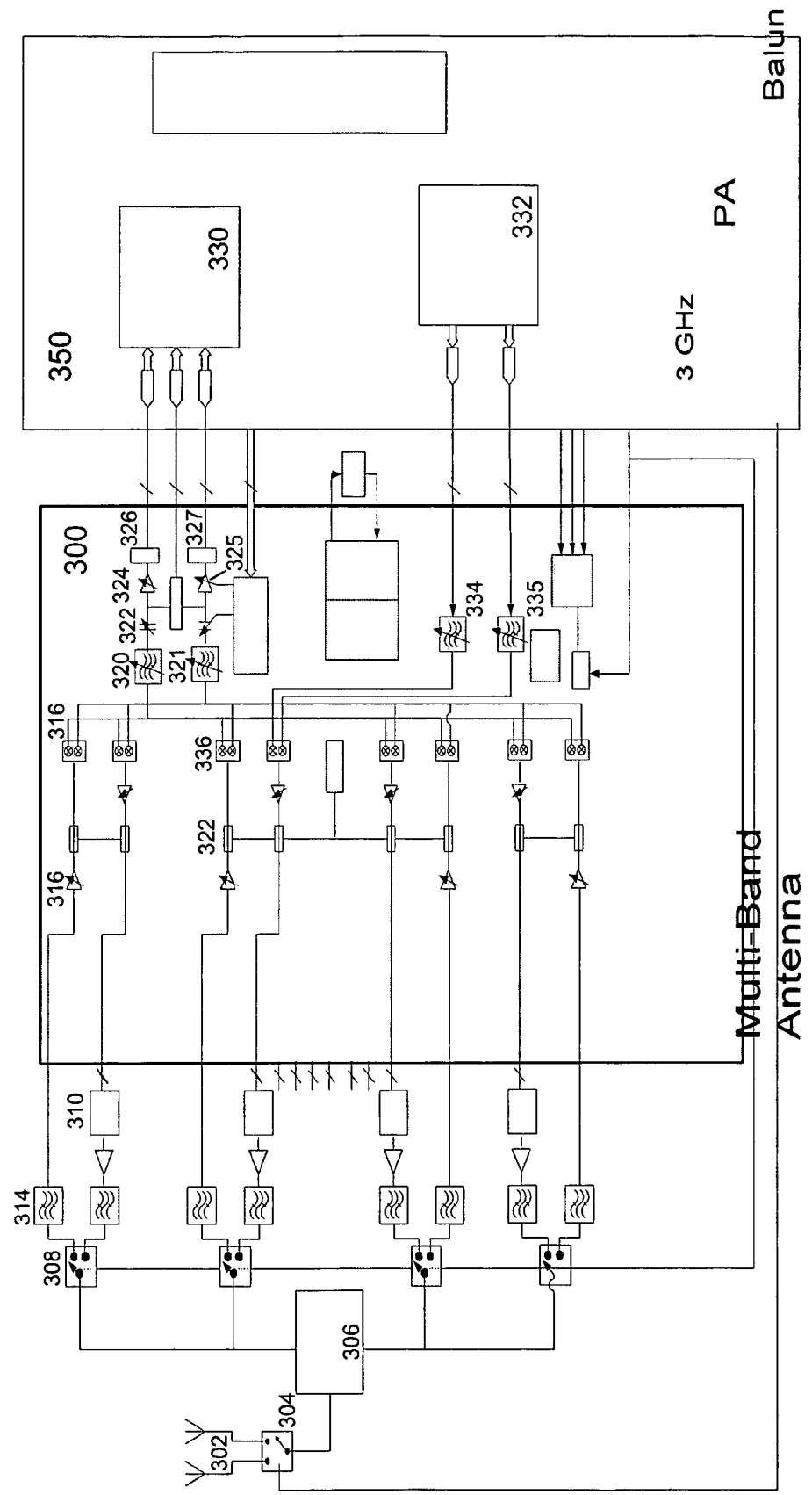

Referring now to FIG. 3, there shows a functional block diagram of a transceiver 300 according to one embodiment of the present invention. The transceiver 300 is implemented in a single integrated circuit chip. As shown in FIG. 3, a multiplexier 304 couples a multi-band antenna 302 to another multiplexier 306. The multiplexier 304 is controlled by a control signal from a bandband processor 350. According to one embodiment, the baseband processor 350 includes a function that determines what carrier frequency is being interacted with or being expected. To facilitate the understanding of the integrated circuit 200, the functions of transmitting and receiving of the transceiver 300 are described respectively.

In a receiving operation, in response to the control signal from the baseband processor 350, the multiplexier 304 selects an appropriate antennal or an antenna with a desired band to coupled received RF signals to another multiplexier 306. The multiplexier 306 is coupled to four different channels 310 respectively for 700 MHz band, 2 GHz band, 3 GHz band, and 5 GHz band (or any other frequencies). In other words, at any given time, only one processing channel is being coupled to the multiplexier 304.

Each of the processing channels 310 includes a functioning means 308 for receiving or transmitting operation. For the description of the present invention, the processing channel for 3 GHz is assumed selected. According to FIG. 3, an upper path of the processing channel is for receiving operation. Thus the received RF signals are processed in a low-pass filter 314 before coupled to a low-noise amplifier (LNA) for amplification. The amplified RF signals are then coupled to a mixer 318 that produces two outputs, referred to as I and Q signals, both are 90 degrees apart in phase. The I and Q signals are then respectively coupled to baseband filters 320 and 321 as well as high-pass filters 322 and 323 before they are respectively amplified in variable gain amplifiers (VGA) 324 and 325. The processed I and Q signals are now respectively coupled to MUXs 326 and 327 before coupled to a receiving function 330 in the baseband processor 350.

According to one embodiment, the baseband filters 320 and 321 are automatically configured or programmable in accordance with a wireless standard. For example, the spectrum response of the baseband filter 320 or 321 is different depending on what standard is being supported. For example, when the baseband processor 350 operates in Wi-Fi, the cut-off frequency of the baseband filters 320 and 321 can be set to be 10 MHz. When the baseband processor 350 operates in WiMAX/High-speed data mode, the cutoff frequency of the baseband filters 320 and 321 can be set to be 24 MHz. Depending on implementation, the baseband filters 320 and 321 may be controlled by control signals from the baseband processor 350 or a mode controller (not shown in FIG. 3). The detail of an exemplary mode controller is provided below.

The transceiver 300 operates with clock signals provided by a single voltage controller oscillator (VCO). Different from prior art systems in which multiple voltage controller oscillators are used to support multiple bands, one of the features of the transceiver 300 is that only one VCO 332 is used to produce different clocks for different bands. According to one embodiment, the VCO 332 is controlled by control signals from the baseband processor 350 or a mode controller. According to another embodiment, a base frequency from the VCO 332 is changed through one or more arithmetic logics, namely the base frequency is doubled, multiplied and divided to support a corresponding frequency for a specified carrier frequency.

Regarding the transmitting operation, modulated signals are provided from a transmitting function in the baseband processor 350 and coupled to a pair of low-pass filters 334 and 335. The filtered signals are then coupled to a mixer (e.g., a mixer 336) that produces a RF signal. It can be understood by those skilled in the art that the remaining transmitting operation is substantially may be similar to a reversed operation of the receiving operation and readily understood. To avoid obscuring aspect of the present invention, further description of the transmitting operation is omitted.

Figure 4:
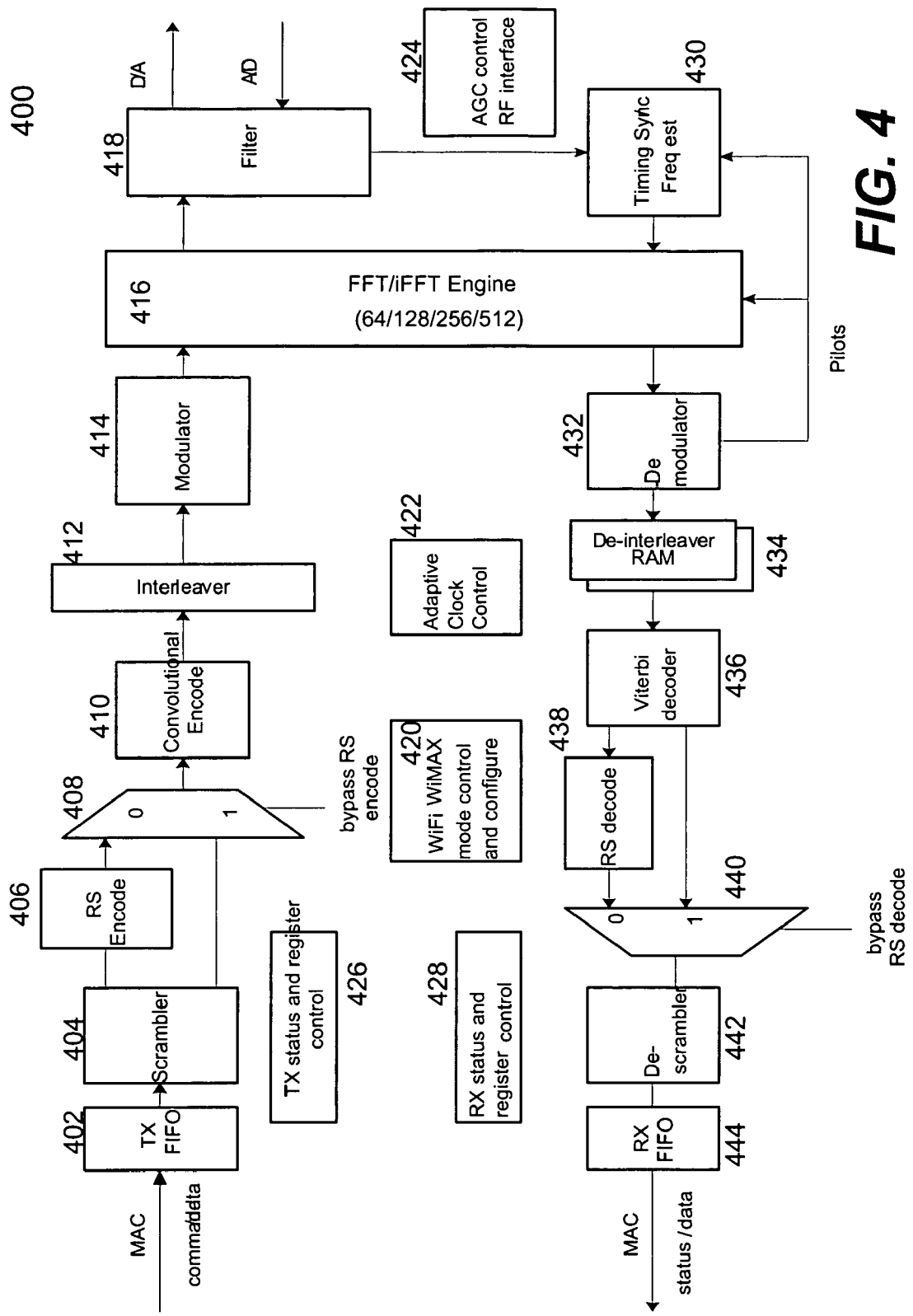

For completeness, FIG. 4 shows a block diagram of a bassband processor 400 that may be used as the baseband processor 350 of FIG. 3, according to one embodiment of the present invention. One of the key features in the bassband processor 400 is the ability of facilitating multiple wireless standards, for example, Wi-Fi and WiMAX. In other words, a same chip designed in accordance with the bassband processor 400 may be used for Wi-Fi communication, WiMAX communication or both.

To facilitate the understanding of the baseband processor 400, functions of transmitting and receiving are described respectively. As shown in FIG. 4, data to be transmitted out or exchanged with another device is coupled to a TX FIFO 402 via one or more media access controllers (MAC). The TX FIFO 402, a buffer designated for transmitting function, is provided to store a transmit command profile and the data. The command profile includes information needed for a baseband to process the data, such as the data length, data rate, subchannelization index, scrambler seed, etc.

In one embodiment, the TX FIFO 402 has a capacity of 128 words in depth and 10 bits in width. Two extra bits are tagged in front of the byte data from the MAC to delimit the burst boundary. At a predefined time, the baseband may be configured to fetch and interpret the command profile and parse the data to a predefined format accordingly. An example of the predefined format pertains to orthogonal frequency division multiplexing (OFDM).

The incoming data is then scrambled in a scrambler 404 to overcome the peak-to-average power ratio problem in the OFDM system. When the integrated circuit 400 operates in the WiMAX mode, the scrambled data goes through a Reed Solomon (RS) encoder 406 to add redundancy bytes for error correction. The output data from the RS encoder 406 is convolution-encoded in a convolution encoder 410. According to one aspect of the present invention, when the integrated circuit 400 operates in the Wi-Fi mode, the RS encoder 406 is not activated. The multiplexier (MUX) 408 is provided to take an output either from the RS encoder 406 or from the scrambler depending on which mode the integrated circuit 400 operates. According to one embodiment, the multiplexier (MUX) 410 is controlled by a signal in accordance with a mode controller 420.

The subsequent blocks including an interleaver 412 and modulator 414 are enabled based on the command profile. The output from the convolution encoder 410 is provided to an interleaver 412. Interleaving the encoded symbols from the convolution encoder 410 provides a form of time diversity to guard against localized corruption or bursts of errors. Since most the error correction codes are designed to correct the random errors, the interleaving is applied to randomize the occurrence of bit errors after the encoding.

The interleaved data from the interleaver 412 is then provided to a modulator 414 that modulates the interleaved data in BPSK, QPSK, 16 QAM or 64 QAM constellation representations. The modulated data is then sent to an FFT engine 416 for an inverse FFT operation. To support various modes, in one embodiment, the OFDM symbol size is run-time configurable, for example, from 64 to 512 points. The data is then provided to a filter 418 for filtering in the Wi-Fi mode or proper sampling rate conversion in the WiMAX mode to meet a specific bandwidth requirement set by, for example, a government agency. The output from the filter is then provided to a D/A converter for transmission.

It should be noted that a mode controller 420 is provided to control the operation mode of the baseband processor 400. The mode controller 420 receives a set of parameters, in one embodiment, from a memory in responding to a setting by a user to determine which mode the baseband processor 400 shall be operating. In another embodiment, the mode controller 420 is configured to determine automatically which mode the baseband processor 400 shall be operating in responding to what type of signal is being received.

An adaptive clock control block 422 is provided; the clock rate at which many functional blocks as described above operate is adaptively selected for different bandwidth to achieve a lower power consumption. A automatic gain control (AGC) block 424 is provided to control the RF interface, for example, to operate in link-based mode (suitable for WiMAX) or packet-based (suitable for Wi-Fi).

As also shown in FIG. 4, when a signal is received, the received signal is digitized via an A/D converter. It should be noted that, in one embodiment, the AGC block 424 is implemented according to a hybrid automatic gain control scheme to adjust a gain in RF adaptively. The timing sync/freq estimation block 430 is used to decide the symbol boundary and estimate the frequency offset. The estimation block 430 is capable of detecting various preamble patterns defined in both standards of Wi-Fi (e.g., 802.11a/b/g) and WiMAX (e.g., 802.16d/e) by performing auto-correlation and cross-correlation with a dynamically scalable moving average window on the incoming RX signals.

The digitized signal is then filtered in the FFT engine 416 for a forward FFT operation. The output from the FFT engine 416 is provided to a De-modulator 432 that performs an inverse operation of the modulator 414. A De-interleaver 414 including a RAM with a predefined capacity receives the demodulated signal from the De-modulator 432 and de-interleaves the signal.

A Viterbi decoder 436 also performs the inverse operation of the convolution encoder 410. Depending on the operating mode, the output from the Viterbi decoder 436 is coupled to a De-scrambler 442 directly or via a RS decoder 438, which is controlled by a multiplexier (MUX) 440 in response to the mode controller 420. A De-scrambler 442 is provided to unscramble the signal from the MUX 440. Subsequently data is recovered and sent to a receiving device via a receiving FIFO 444.

It should be noted that the transmitting and receiving functions have been described respectively. Those skilled in the art that the implementations of the functions blocks in the transmitting and receiving path are not necessarily implemented independently. Some of the functions blocks can be readily controlled to perform either a forward or an inverse operation. For example, a RS codec can be configured to perform both encoding and decoding. Likewise, a scrambler, an interleaver and a modulator can be configured to perform both scrambling, interleaving, modulating, and unscrambling, de-interleaving, de-modulating.

One of the features in the present invention is to provide an architecture capable of supporting at least two respective communication standards to facilitate communications. One of the benefits, advantages and features includes a smaller die size of chips so designed to be used in devices such as a transceiver, a portable device and a communication infrastructure.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. While the embodiments discussed herein may appear to include some limitations as to the presentation of the information units, in terms of the format and arrangement, the invention has applicability well beyond such embodiment, which can be appreciated by those skilled in the art. Accordingly, the scope of the present invention is defined by the appended claims rather than the foregoing description of embodiments.

We claim:

1. An integrated circuit comprising:
   a plurality of processing channels, each configured for a specified carrier frequency and including at least an amplifier and a low-pass filter, wherein the low-pass filter is automatically programmable in accordance with a wireless standard; and a single voltage controller oscillator (VCO) to support operations of each of the processing channels; and
   a mode controller configured to provide a first mode and a second mode, wherein the integrated circuit supports a first standard of communication when the mode controller commands the first mode, the integrated circuit supports a second standard of communication when the mode controller commands the second mode, and
   wherein the integrated circuit is coupled to a baseband processor to provide a total solution for wireless communication in different standards including the first and second standards, the baseband processor includes a RS codec that is deactivated when the mode controller commands the first mode.

2. The integrated circuit as recited in claim 1, wherein the processing channels are coupled to a switching means that determines which one of the processing channels is coupled to another switching means for proper operation on an antenna.

3. The integrated circuit as recited in claim 2, wherein there are a number of antennas, each designed for one specified carrier frequency, only one of the antenna is selected by the another switching means.

4. The integrated circuit as recited in claim 1, wherein the amplifier in each of the processing channels is a variable gain amplifier (VGA).

5. The integrated circuit as recited in claim 1, wherein each of the processing channels further comprises a mixer that produces two signals from an amplified RF signal from the amplifier, both being 90 degrees apart in phase.

6. The integrated circuit as recited in claim 1, wherein either one of the first and second standards is one of Wi-Fi and WiMAX.

7. The integrated circuit as recited in claim 6, wherein a cut-off frequency of the low-pass filter is programmable based on different WiMax/WiFi modes and specific applications.

8. The integrated circuit as recited in claim 7, wherein a base frequency of the VCO is arithmetically and automatically modified when an operation mode is selected among 802.11a, 802.11b, 802.11g, 802.16d and 802.16e.

9. The integrated circuit as recited in claim 1, wherein the RS codec is coupled between a scrambler and a convolution encoder, but signals are coupled between the scrambler and the convolution encoder.

10. The integrated circuit as recited in claim 9, wherein a multiplexer is provided to ensure that signals are received from the scrambler.

11. The integrated circuit as recited in claim 1, wherein the baseband processor includes a RS codec that is activated when the mode controller commands the second mode.

12. The integrated circuit as recited in claim 11 wherein the RS codec is coupled between a scrambler and a convolution encoder, and signals are coupled from the RS codec to the convolution encoder.

13. The integrated circuit as recited in claim 12, wherein a multiplexer is provided to ensure that signals are received from the RS codec.

14. The integrated circuit as recited in claim 1, wherein the baseband processor includes
   at least a FIFO buffer;
      a first circuit, coupled to the FIFO buffer, performing either scramblering or unscramblering;
      a second circuit performing either convolution encoding or Viterbi decoding;
      a RS codec coupled between the first circuit and the second circuit;
      a third circuit performing either interleaving or de-interleaving;
      a forth circuit performing either modulating or demodulating, wherein the third circuit couples the second circuit to the forth circuit;
      an FFT engine coupled to the firth circuit; and
      a filter to ensure outgoing signals compliant with a communication standard, and filter out unwanted signals from incoming signals.

15. The integrated circuit as recited in claim 14 further including an AGC control circuit to ensure that integrated circuit operates in a link-based mode or a packet-based mode.

16. The integrated circuit as recited in claim 1, wherein the mode controller is provided to control directly or indirectly an operation mode of the integrated circuit, the mode controller receives a set of parameters from a memory in responding to a setting by a user to determine which mode the integrated circuit shall be operating.

17. The integrated circuit as recited in claim 1, wherein the mode controller is provided to control an operation mode of the integrated circuit, the mode controller is configured to determine automatically which mode the integrated circuit shall be operating in responding to what type of signals is being received.

18. The integrated circuit as recited in claim 1, wherein the integrated circuit is used in a transceiver to relay communications between a wireless infrastructure and a mobile device, the communications are conducted in two different standards across the transceiver.

* * * * *